3,136,704
MANUFACTURE OF GENTAMYCIN
William Charney, Bloomfield, N.J., assignor to Schering Corporation, Bloomfield, N.J., a corporation of New Jersey
No Drawing. Filed Dec. 5, 1962, Ser. No. 242,376
8 Claims. (Cl. 195—80)

This invention relates to an improvement in the production of gentamycin by a gentamycin producing strain of Micromonospora in an aqueous nutrient medium under aerobic conditions. The invention sought to be patented is described as residing in the concept of enhancing the production of gentamycin by a gentamycin-producing strain of Micromonospora under aerobic conditions in an aqueous nutrient medium, said medium containing cobalt in the concentration range of from about $2.5 \times 10^{-9}$ grams per milliliter to less than $1.25 \times 10^{-5}$ grams per milliliter; the cobalt being in the form of a water soluble salt.

Gentamycin is a known stable, basic, water soluble antibiotic described and claimed by Luedemann and Weinstein in their copending application Serial No. 211,-153, filed July 16, 1962 and now U.S. Patent No. 3,091,-572. Gentamycin is a highly effective antibiotic active against both gram-positive and gram-negative microorganisms such as species of Staphylococcus, Klebsiella, Pseudomonas, and Proteus. It therefore, became highly desirable from an economic viewpoint to discover methods for the enhancement of gentamycin-production that would be industrially feasible.

Heretofore, as described by Luedemann et al., supra, gentamycin has been prepared by growing a gentamycin-producing strain of Micromonospora at a temperature of about 25°–40° C. under aerobic conditions in an aqueous nutrient medium containing an assimilable carbon and nitrogen source. A particularly advantageous gentamycin-producing strain of Micromonospora is *M. purpurea*, NRRL 2953. Other available species and strains are *M. echinospora* NRRL 2985 and *M. echinospora* var. *pallida* NRRL 2996 and *M. echinospora* var. *ferruginea* NRRL 2995. The NRRL designation is the culture collection number of the collection maintained by the United States Department of Agriculture, Northern Utilization Research and Development Division, Peoria, Illinois, where the organisms have been deposited and from whence they are available.

*M. purpurea* can be adequately cultivated as described above in the presence of a source of assimilable carbon such as starch, dextrose, sugars and the like coupled with a source of assimilable nitrogen such as soybean meal, peptones and the like. In the absence of a cobalt supplement, profuse growth may be obtained, however, the production of gentamycin during such growth will be limited. I have found that adding a cobalt supplement to the growth medium will significantly increase the gentamycin production over that obtainable in the absence of cobalt.

It is apparent that cobalt is not a requisite for growth of the microorganism but is a requisite for a commercially feasible process in that the presence of cobalt in the fermentation permits the production of gentamycin in such quantities as to warrant commercial utilization.

Although the fermentation medium may naturally contain trace metals such as cobalt, the concentration of cobalt apparently is insufficient to enhance antibiotic production. I have determined that in order to realize optimum enhancement of gentamycin, at least 0.01 microgram (mcg.) of cobalt (as $CoCl_2 \cdot 6H_2O$) must be present per milliliter of medium. This is equivalent to $2.5 \times 10^{-9}$ gram of cobalt per milliliter. I obtain this minimal concentration of cobalt by supplementing a fermentation medium by adding cobalt in the form of one of its soluble salts such as cobaltous chloride (or its hexahydrate), cobaltous nitrate and the like. I have found that cobaltic ion also enhances antibiotic production but apparently not to the same degree as cobaltous ion. It would appear that any ionizable water soluble salt of cobalt will effect the increase in antibiotic production such as the sulfate, lower alkanoate, halide, and the like.

In the course of increasing production of gentamycin by adding cobalt to the fermentation medium wherein a gentamycin producing strain of *Micromonospora*, such a gentamycin producing strain of Micromonospora, such found that there is an upper limit on the amount of cobalt that may be present without deleteriously effecting the yield of antibiotic. The upper limit appears dependent upon the medium; whether it is purely synthetic or derived from natural sources. The purely synthetic or highly refined medium is usually deficient in other trace elements requisite for organism growth and antibiotic production. Thus a toxic level of cobalt is reached at a much lower level than with a medium derived from natural sources. A concentration of cobalt in a synthetic fermentation medium up to 5 micrograms per milliter (calculated as $CoCl_2 \cdot 6H_2O$), $1.25 \times 10^{-6}$ mcg. of cobalt, will still increase antibiotic production. At 10 micrograms per milliliter (calculated as $CoCl_2 \cdot 6H_2O$) antibiotic production is diminished to trace quantities despite the fact that organism growth is profuse. In a "natural medium" an optimum increase in gentamycin production is obtained by the addition of up to 0.8–1.0 mcg. cobalt chloride (hexahydrate). Production levels are maintainable with up to about 50 mcg. of cobalt chloride (hexahydrate) after which concentration toxic effects become manifest and the yield of gentamycin drops below that carried out in the absence of a cobalt supplement. It would thus appear that one can supplement the fermentation medium with cobalt in the range of from $2.5 \times 10^{-9}$ grams of cobalt per milliliter to less than $12.5 \times 10^{-6}$ grams per milliliter (0.01 mcg. of 50 mcg. per milliliter calculated as $CoCl_2 \cdot 6H_2O$). In view of a "plateau effect" I prefer to utilize a concentration of about 0.1 mcg. of cobalt per milliliter which more than adequately effects enhancement.

Various types of fermentation media have been utilized and in all of them enhancement of both organism growth and antibiotic production results from the addition of cobalt below a toxic level.

Gentamycin production is increased several-fold with the fermentation of *M. purpurea*. The other aforementioned species are also enhanced to a somewhat analogous extent in their gentamycin producing properties. Although gentamycin production is increased even with the other aforementioned species and strains of Micromonospora, the differences in enhancement may be due to the fact that optimum conditions for organism growth may not have been attained to the same degree as was attained with *M. purpurea*. It is believed that first prolific growth of microorganism is necessary to produce sufficient quantities of a particular, at present, unknown, enzyme which is a requisite in gentamycin production. The ability of the enzyme to act is enhanced by the presence of cobalt; however, it appears that beyond the concentrations set forth heretofore, cobalt exerts a toxic effect on the enzyme and gentamycin production falls off rapidly. It is to be understood that the foregoing is merely my theory as to the interaction of cobalt in enhancing gentamycin production, however, it is not to be construed as being the actual means or mechanism since such at present is unknown.

In the examples which follow are described various experiments involving the production of gentamycin by fermenting *M. purpurea* in different media in the presence of varying concentrations of cobalt. The quantity of antibiotic produced is expressed in units per milliliter. The various runs are assayed microbiologically by the standard disc-type agar diffusion assay technique using *Staphylococcus aureus* (ATCC 6538P) as test organism. A reference curve is prepared by plotting the dosage response of the produced antibiotic in a particular volume of fermentation medium diluted in phosphate buffer (at pH 8) in a test medium consisting of:

|  | Percent |
|---|---|
| Peptone | 0.6 |
| Pancreatic digest of casein | 0.4 |
| Yeast extract | 0.3 |
| Beef extract | 0.15 |
| Dextrose | 0.15 |
| Agar | 1.5 | in which the pH is adjusted to 8.0 with sodium hydroxide solution. A suspension of the array organism (*S. aureus*) is standardized to provide 20% transmission at 660 m$\mu$ in a colorimeter. The potency of the sample is determined from the reference curve and expressed in terms of units per milliliter (a unit being that amount of antibiotic required to produce an 18 mm. zone of inhibition with a 13.5 mm. disc.

EXAMPLE 1

*Fermentation of M. Purpurea to Yield Gentamycin (Both With and Without Cobalt Present)*

*Germination stage.*—A lyophilized culture of *M. purpurea* is added to a 300 ml. shake flask containing 100 ml. of the following sterile medium:

| Bacto-beef extract | gm | 3 |
|---|---|---|
| Tryptose | gm | 5 |
| Dextrose | gm | 1 |
| Starch (soluble) | gm | 24 |
| Yeast extract | gm | 5 |
| Tap water | ml | 1000 |

The flask and its contents are incubated for 5 days at 37° C. on a rotary shaker (280 r.p.m., 2 inch stroke).

*Inoculum preparation stage.*—Two batches of inoculum of about 50 gallons each are prepared by the following method: A 25 ml. inoculum (from the germination stage) is transferred to each of four 2-liter flasks, each containing 500 ml. of the sterile medium utilized for germination. The flasks and contents are incubated for 5 days at 28° C. on a rotary shaker (280 r.p.m., 2″ stroke). The contents of the flasks are pooled, a 25 ml. inoculum (taken from the pool) is added to each of twenty 2-liter flasks, each containing 500 ml. of the following sterile medium:

| Soybean meal | gm | 30 |
|---|---|---|
| Dextrose (cerelose) | gm | 40 |
| Calcium carbonate | gm | 1 |
| Tap water | ml | 1000 |

The flasks and their contents are incubated for 3–5 days at 28° C. on a rotary shaker (280, 2″ stroke). The broth is pooled and asceptically transferred into a sterile inoculum flask having a side arm (total volume—about 10 liters).

The 10 liters of inoculum is asceptically transferred to a 65 gallon fermenter containing 50 gallons of the following sterile medium:

| Bacto-beef extract | gm | 600 |
|---|---|---|
| Bacto-tryptose | gm | 1000 |
| Dextrose (cerelose) | gm | 200 |
| Starch (soluble) | gm | 4800 |
| Yeast extract | gm | 1000 |
| Anti-foamer GE 60 (General Electric Co. brand of silicone defoamer), or other defoamer | ml | 100 |
| Tap water, q.s. to | gallons | 50 |

The pH is adjusted to 6.9–7.0 before sterilization and aerobic fermentation is effected for 24 hours (until the packed cell volume is about 10–15%) under the following conditions:

| Temperature | 37° C. |
|---|---|
| Sterile air input | 54 cubic ft./min. |
| Pressure | 7 p.s.i. |
| Agitation | 180 r.p.m. |

*Fermentation stage.*—One 50 gallon batch of inoculum is asceptically transferred to a 675 gallon fermenter (fermenter A) containing the following medium:

| Soybean meal | kg | 54.0 |
|---|---|---|
| Cerelose | kg | 72.0 |
| Calcium carbonate | kg | 9.0 |
| Antifoamer (G.E. 60) | ml | 300 |
| Soft water | gallons | 450 | and the other 50 gallon batch of inoculum is asceptically transferred to a similar fermenter (fermenter B) containing the same medium as fermenter A with the addition of 200 mg. of $CoCl_2 \cdot 6H_2O$. Fermentation is effected in each fermenter at 35° C. while agitating at 120 r.p.m. with air input at 7 p.s.i. and 15 cu. ft./min. At various times, samples of the fermented broth are withdrawn and assayed for antibiotic production by the disc assay method described heretofore. The following table shows the increase in yield effected by the presence of cobalt.

| Fermentation time (hours) | Yield of gentamycin (units/ml.) | |
|---|---|---|
| | Fermenter A (no cobalt) | Fermenter B (cobalt present) |
| 24 | 9.3 | 13 |
| 40 | 34 | 133 |
| 48 | 49 | 185 |
| 60 | 70 | 332 |
| 72 | 77 | 440 |
| 96 | 75 | 420 |

EXAMPLE 2

*Production of Gentamycin in Various Synthetic Media*

A lyophilized culture of *M. purpurea* is germinated according to the procedure described in Example 1. After shaking for 4 days at 30° C., a 5 ml. inoculum is asceptically added to 100 ml. of the same sterile medium utilized in the germination stage and the mixture is shaken for 3 days at 30° C. A 25 ml. inoculum is then asceptically added to 500 ml. of the same sterile medium in a 2 liter flask and incubated while shaking for 3 days at 30° C. The cell material is harvested by centrifuging the fermentation mixture in a sterile bottle. The solids are washed by centrifuging twice with 100 ml. of sterile distilled water per wash and then suspended in 100 ml. of sterile distilled water. The suspension is used as a 3–5% inoculum when added to various synthetic media for fermentation and determination of antibiotic (gentamycin) production. The test fermentations are carried out in shake flasks and assayed by the disc agar method as described heretofore. The results of these runs, both with and without cobalt being present are as follows:

| Medium | Shake time (days) | Cobalt concentration, mcg./ml. as $CoCl_2 \cdot 6H_2O$ | Assay (units/ml.) |
|---|---|---|---|
| Monosodium glutamate, 3% Dextrose, 4% $CaCO_3$, 0.1% | 5 | 0.0 | 2.3 |
| | | 0.1 | 10 |
| Pharmamedia cottonseed, 1% Cerelose, 4% | 2 | 0.0 | *18.3 |
| | | 5.0 | *22.4 |
| Yeast extract, 1% Cerelose, 1% $CaCO_3$, 0.1% | 3 | 0.0 | 8.0 |
| | | 0.1 | 47 |
| Soybean meal, 3% | 4 | 0.0 | 68 |
| | | 0.01 | 171 |
| | | 0.05 | 250 |
| | | 0.10 | 210 |
| Cerelose, 4% | 6 | 0.0 | 107 |
| | | 0.05 | 300 |
| $CaCO_3$, 0.5% | 7 | 0.0 | 116 |
| | | 0.05 | 346 |
| | | 0.10 | 398 |

*Min. zone of inhibition.

EXAMPLE 3

*Effect of Varying Concentrations of Cobalt on Gentamycin Production*

A. IN A SYNTHETIC MEDIUM

A 3% inoculum of *M. purpurea* prepared as described in Example 2, was added to the following medium containing different quantities of cobalt and the whole fermented as before. Antibiotic production (gentamycin) was determined by the disc agar technique described heretofore and results obtained as indicated below:

| Medium: | Gms./liter |
|---|---|
| Dextrin | 30 |
| $NaNO_3$ | 2 |
| $K_2HPO_4$ | 1 |
| $MgSO_4$ | 0.5 |
| KCl | 0.5 |
| $FeSO_4$ | 0.01 |

| Conc. cobalt (mcg./ml.) as $CoCl_2 \cdot 6H_2O$: | Zone of inhibition (mm.) |
|---|---|
| 0.0 | 16. |
| 5.0 | 18.6. |
| 10 | Trace. |
| 20 | Trace. |
| 40 | No antibiotic produced. |

B. IN A MEDIUM DERIVED FROM NATURAL SOURCES

A 3% inoculum of *M. purpurea* prepared as described in Example 2 was added to the following medium containing different quantities of cobalt and the whole fermented for 5 days in a shake flask at 28° C. Gentamycin production was determined by disc agar method described heretofore.

| Medium: | Gms./liter |
|---|---|
| Soybean meal | 30 |
| Cerelose | 40 |
| Calcium carbonate | 1 |
| Tap water | 1000 |

| Conc. cobalt (mcg./ml.) as $CoCl_2 \cdot 6H_2O$: | Yield of gentamycin (units/ml.) |
|---|---|
| 0.0 | 82.5 |
| 0.2 | 181.3 |
| 0.4 | 187.5 |
| 0.6 | 273.0 |
| 0.8 | 287.5 |
| 1.0 | 268.8 |
| 3.0 | 246.0 |
| 6.0 | 256.0 |
| 8.0 | 206.0 |
| 10.0 | 194.0 |
| 12.0 | 188.0 |
| 15.0 | 180.0 |
| 20.0 | 180.0 |
| 40.0 | 158.0 |
| 60.0 | 41.0 |
| 80.0 | 33.0 |

When the foregoing experiments are conducted with other gentamycin-producing strains of Micromonospora such as *M. echinospora* and its variants, var. *ferruginea* or var. *pallida*, analogous results are obtained. Where cobalt has enhanced the antibiotic production of *M. purpurea*, an enhancement is also observed with the other gentamycin-producing species.

I claim:

1. In a process for the production of gentamycin whereby a gentamycin-producing strain of Micromonospora is cultivated in an aqueous nutrient medium under aerobic conditions until gentamycin is produced and isolated therefrom, the improvement which comprises effecting the cultivation in a medium containing from about $2.5 \times 10^{-9}$ grams per milliliter of cobalt to less than $1.25 \times 10^{-5}$ grams per milliliter of cobalt, said cobalt being in the form of a water soluble salt.

2. In a process for the production of gentamycin whereby a gentamycin-producing strain of Micromonospora is cultivated in an aqueous nutrient medium under aerobic conditions until gentamycin is produced and isolated therefrom, the steps which comprise adding to said medium a water soluble salt of cobalt in sufficient quantities to provide a concentration of cobalt in the range of about $2.5 \times 10^{-9}$ grams per milliliter to less than $1.25 \times 10^{-5}$ grams per milliliter and effecting the aforesaid cultivation therein.

3. The process of claim 1 wherein the gentamycin-producing strain of Micromonospora is selected from the group consisting of *M. purpurea*, *M. echinospora*, colorable variants and mutants thereof.

4. The process of claim 1 wherein the microorganism is *Micromonospora purpurea*.

5. The process of claim 1 wherein the microorganism is *Micromonospora echinospora*.

6. The process of claim 1 wherein the microorganism is *Micromonospora echinospora* var. *pallida*.

7. The process of claim 1 wherein the microorganism is *Micromonospora echinospora* var. *ferruginea*.

8. The process of claim 1 wherein the cobalt is in the form of a chloride.

References Cited in the file of this patent

Foster: Chemical Activities of Fungi, Academic Press, Inc., New York, N.Y., 1949, page 278.

Lamanna et al.: Basic Bacteriology, Williams and Wilkins Co., Baltimore, Md., 1953, pages 359–369.

UNITED STATES PATENT OFFICE
Certificate of Correction

Patent No. 3,136,704                                                          June 9, 1964

William Charney

It is hereby certified that error appears in the above numbered patent requiring correction and that the said Letters Patent should read as corrected below.

Column 2, line 21, strike out "a gentamycin producing strain of Micromonospora, such" and insert instead —as *M. purpurea*, is being cultivated and grown, I have—; column 3, line 35, for "array" read —assay—; column 4, line 22, for "54" read —5.4—.

Signed and sealed this 17th day of November 1964.

[SEAL]

Attest:
ERNEST W. SWIDER,
*Attesting Officer.*

EDWARD J. BRENNER,
*Commissioner of Patents.*